(12) United States Patent
Aposhian et al.

(10) Patent No.: US 11,483,968 B2
(45) Date of Patent: Nov. 1, 2022

(54) DYNAMICALLY ADJUSTING THE CUTTING HEIGHT OF A MOWER DECK BASED ON A MOWER'S LOCATION

(71) Applicant: FireFly Automatix, Inc., North Salt Lake, UT (US)

(72) Inventors: Steven R. Aposhian, Farmington, UT (US); Eric E. Aston, Farmington, UT (US); William M. Decker, Salt Lake City, UT (US); Seth W. Jeppson, Clearfield, UT (US); Mark C. LeBlanc, Salt Lake City, UT (US); Austin J. Neuner, Layton, UT (US); Andrew W. Limpert, American Fork, UT (US)

(73) Assignee: FireFly Automatix, Inc., North Salt Lake, UT (US)

( * ) Notice: Subject to any disclaimer, the term of this patent is extended or adjusted under 35 U.S.C. 154(b) by 626 days.

(21) Appl. No.: 16/532,240

(22) Filed: Aug. 5, 2019

(65) Prior Publication Data

US 2021/0037702 A1 Feb. 11, 2021

(51) Int. Cl.
*A01D 34/74* (2006.01)
*A01D 34/835* (2006.01)
*A01D 101/00* (2006.01)
*A01D 34/00* (2006.01)

(52) U.S. Cl.
CPC .......... *A01D 34/008* (2013.01); *A01D 34/74* (2013.01); *A01D 34/835* (2013.01); *A01D 2101/00* (2013.01)

(58) Field of Classification Search
CPC .... A01D 34/008; A01D 34/74; A01D 34/835; A01D 2101/00

USPC ....................................................... 56/10.2 R
See application file for complete search history.

(56) References Cited

U.S. PATENT DOCUMENTS

| 7,089,722 B2 | 8/2006 | Laskowski |
| 8,392,044 B2 | 3/2013 | Thompson et al. |
| 9,949,431 B2 | 4/2018 | Willgert et al. |
| 2011/0288729 A1 | 11/2011 | McKinney |

FOREIGN PATENT DOCUMENTS

| WO | WO-2013049324 A1 * | 4/2013 | ............. A01D 34/64 |
| WO | WO-2016097896 A1 * | 6/2016 | ........... A01D 34/008 |

* cited by examiner

*Primary Examiner* — Mahmoud Gimie
(74) *Attorney, Agent, or Firm* — Kirton McConkie; Brian Tucker

(57) ABSTRACT

A mower can dynamically adjust the cutting height of a mower deck based on a mower's location. As a mower travels over an area of grass to be cut, a control system can track the current location of each mower deck on the mower. The control system can compare the current location of a mower deck to a boundary of one or more sections defined within the area to thereby determine which section the mower deck is within. When the control system detects that a mower deck has crossed or will cross into a section, it can identify a particular cutting height assigned to the section and dynamically adjust the cutting height of the mower deck to the particular cutting height. When a mower includes more than one mower deck, the control system can be configured to independently adjust the cutting height of each mower deck based on its location.

20 Claims, 12 Drawing Sheets

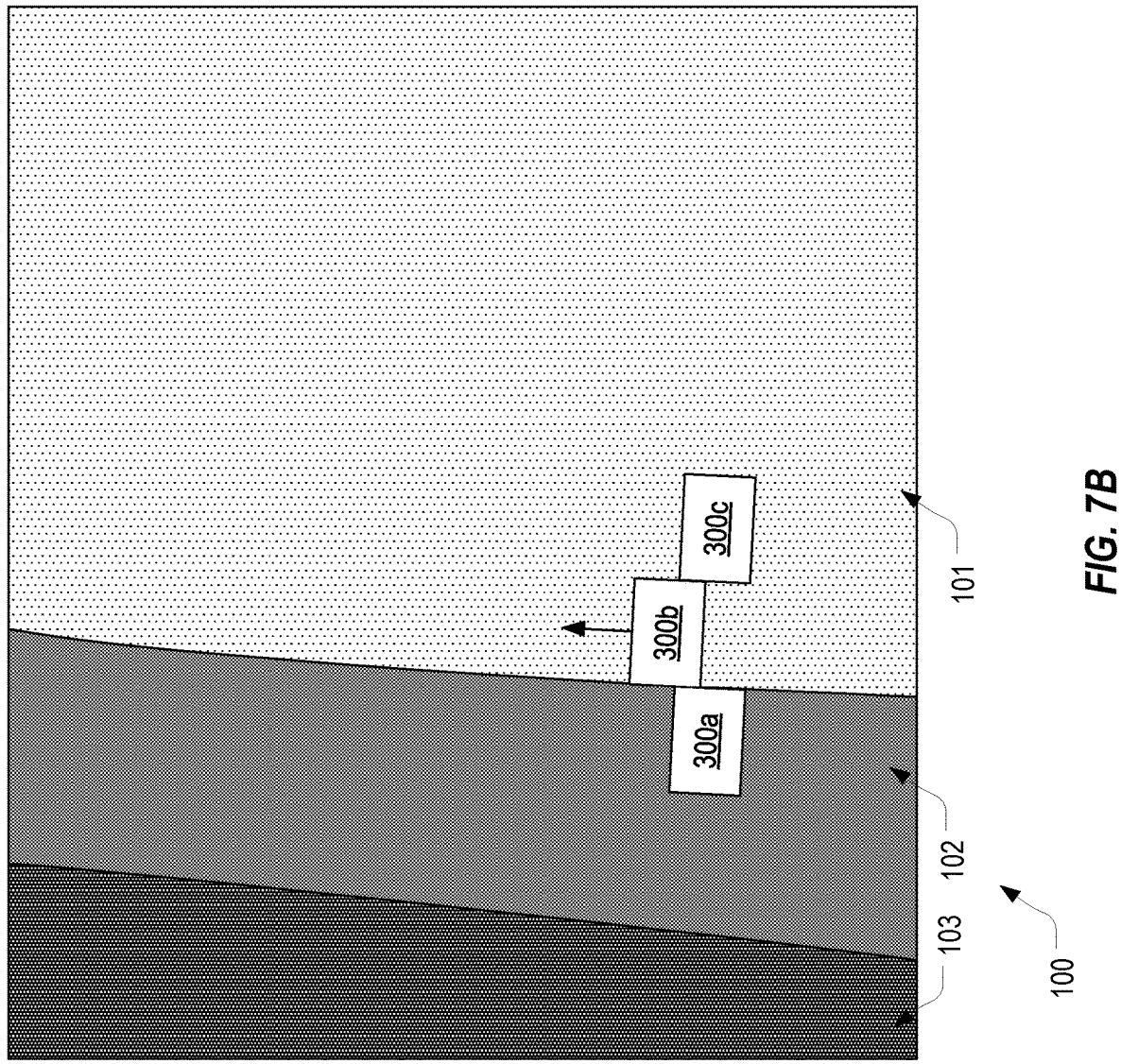

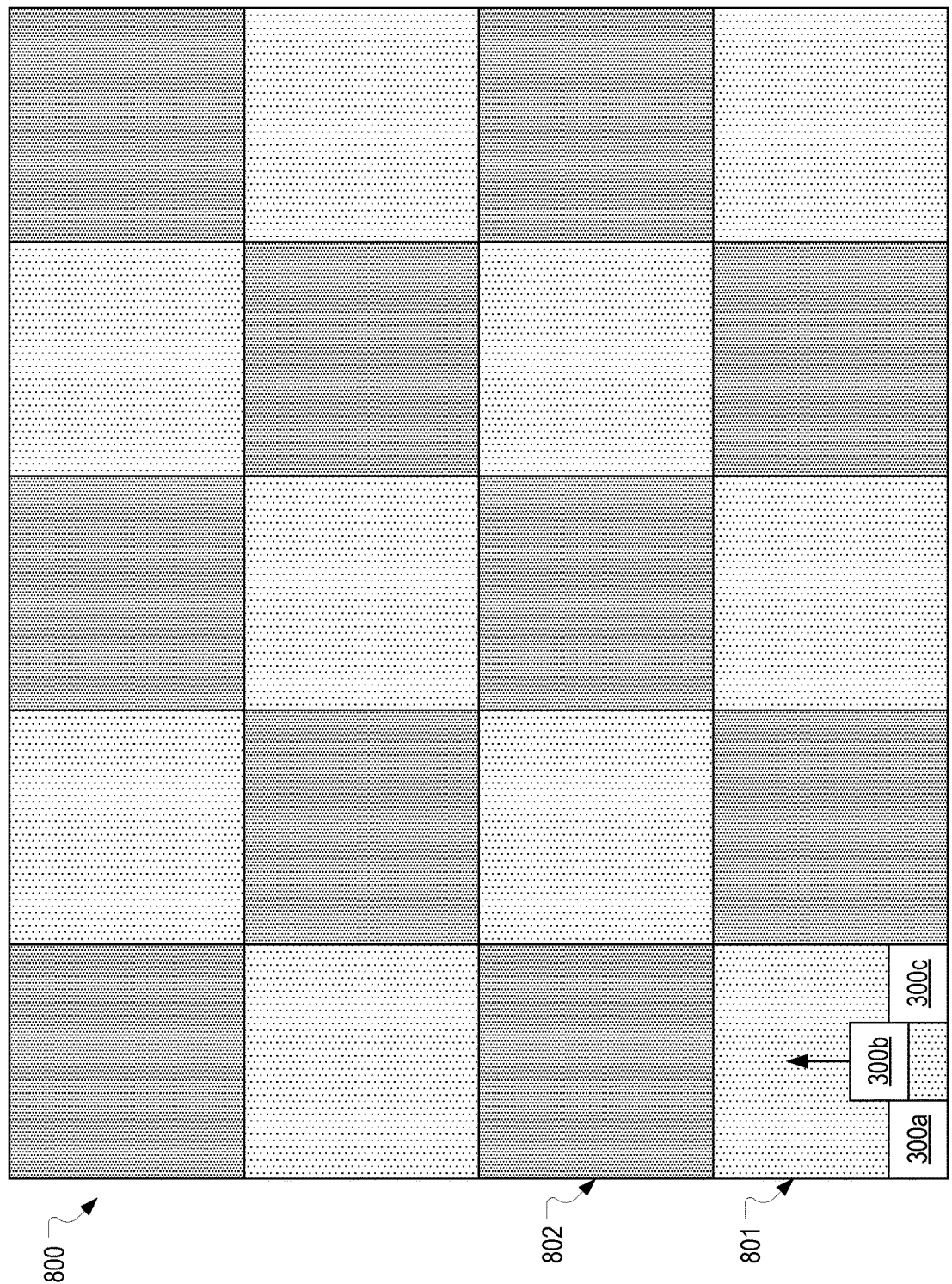

DYNAMICALLY ADJUSTING THE CUTTING HEIGHT OF A MOWER DECK BASED ON A MOWER'S LOCATION

CROSS-REFERENCE TO RELATED APPLICATIONS

The subject matter of this application can be used in conjunction with the Adjustable Mower Decks described in U.S. patent application Ser. No. 15/795,065 ("the '065 application") which was filed on Oct. 26, 2017 and U.S. patent application Ser. No. 16/257,942 ("the '942 application") which was filed on Jan. 25, 2019, both of which are incorporated herein by reference.

BACKGROUND

Golf courses and other grassy areas include sections of grass that are cut at different heights. For example, a typical hole on a golf course includes a fairway and a rough surrounding the fairway which is typically maintained at a much taller height than the fairway. In many cases, the rough may include multiple sections that are maintained at incrementally taller heights.

FIG. 1 provides an example of a grassy area (which in this case is a golf hole 100) that includes sections of grass that are each cut at different heights. Hole 100 includes a fairway 101, a first cut of rough 102 that surrounds the fairway 101, and a second cut of rough 103 that surrounds the first cut of rough 102. The height of the grass in these sections will vary depending on the type of the grass (e.g., bermudagrass vs. bluegrass), the location (e.g., Florida vs. Minnesota), the time of year, etc. As examples only, the fairway 101 may be cut at a height between 0.35 and 0.625 inches, the first cut of rough 102 may be cut at a height between 1.0 and 1.75 inches and the second cut of rough 103 may be cut at a height between 2.0 and 6.0 inches.

To create these separate sections of different grass heights, multiple mowers are commonly used. For example, a golf course may have a first mower with mower deck(s) set to a height of 0.5 inches for cutting the fairway 101, a second mower with mower deck(s) set to a height of 1 inch for cutting the first cut of rough 102 and a third mower with mower deck(s) set to a height of 2 inches for cutting the second cut of rough 103. Many golf courses do not have the resources to own and maintain mowers for many sections of grass. These golf courses may therefore choose to provide only a fairway and a single cut of rough.

Alternatively, a golf course may have a single mower that it uses to cut all of the sections or at least multiple sections. In such cases, it will be necessary to adjust the height of the mower deck(s) prior to cutting each section. This can be a tedious process. It may also be difficult to consistently set the height of the mower decks. For these reasons, golf courses may again choose to provide only a fairway and a single cut of rough. In short, because it is more difficult and costly to cut multiple sections of rough, many golf courses do not do so. Those that do are faced with the added cost of owning multiple mowers and/or the adding difficulty of adjusting the cutting height.

BRIEF SUMMARY

The present invention extends to a mower and methods for dynamically adjusting the cutting height of a mower deck based on a mower's location. As a mower travels over an area of grass to be cut, a control system can track the current location of each mower deck on the mower. The control system can compare the current location of a mower deck to a boundary of one or more sections defined within the area to thereby determine which section the mower deck is within. When the control system detects that a mower deck has crossed or will cross into a section, it can identify a particular cutting height assigned to the section and dynamically adjust the cutting height of the mower deck to the particular cutting height. When a mower includes more than one mower deck, the control system can be configured to independently adjust the cutting height of each mower deck based on its location.

In some embodiments, the present invention can be implemented as mower having a first mower deck that includes at least one actuator and at least one height adjustment mechanism that is driven by the at least one actuator. The at least one height adjustment mechanism controls a cutting height of the first mower deck. The mower can also include one or more location sensors that provide current location values and a control system that is coupled to the one or more location sensors and to the at least one actuator of the first mower deck. The control system can be configured to perform a method for dynamically adjusting the cutting height of the first mower deck while the mower travels within an area of grass to be cut. This method includes: monitoring the current location values provided by the one or more sensors; determining, from the current location values, a current location of the first mower deck; detecting that the current location of the first mower deck is within a first section of the area; identifying a first cutting height assigned to the first section; and providing one or more cutting height control signals to the at least one actuator of the first mower deck, the one or more cutting height control signals causing the at least one actuator to drive the at least one height adjustment mechanism to thereby set the cutting height of the first mower deck to the first cutting height.

In other embodiments, the present invention is implemented by a control system of a mower having one or more mower decks as a method for dynamically adjusting a cutting height of the one or more mower decks while the mower travels within an area of grass to be cut. The control system can receive current location values from one or more sensors on the mower and determine, from the current location values, a current location of a first mower deck of the one or more mower decks. The control system can also detect that the current location of the first mower deck is within a first section of the area and identify a first cutting height assigned to the first section. The control system can then provide one or more cutting height control signals to at least one actuator on the first mower deck. The one or more cutting height control signals cause the at least one actuator to drive at least one height adjustment mechanism on the first mower deck to thereby set a cutting height of the first mower deck to the first cutting height.

In other embodiments, the present invention is implemented by a control system of a mower having at least a first mower deck and a second mower deck as a method for dynamically adjusting a cutting height of the first and second mower decks while the mower travels within an area of grass to be cut. The control system can receive current location values from one or more location sensors on the mower and determine, from the current location values, a current location of the first mower deck and a current location of the second mower deck. The control system can also detect that the current location of the first mower deck is within a first section of the area and that the current location of the second mower deck is within a second section of the area. The control system can further identify a first cutting height assigned to the first section. The control system then provides one or more first cutting height control signals to at least one actuator on the first mower deck. The one or more first cutting height control signals cause the at least one actuator on the first mower deck to drive at least one height adjustment mechanism on the first mower deck to thereby set a cutting height of the first mower deck to the first cutting height.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 7A and 7B provide an example of how the cutting height of multiple mower decks on the same mower can be independently adjusted; and FIG. 8 provides another example of how the cutting height of a mower deck can be dynamically adjusted based on a mower's location.

DETAILED DESCRIPTION

In this specification and the claims, the term "mower" should be construed as equipment that can be propelled across the ground and that is capable of cutting grass. One of skill in the art would understand that there are many different types and configurations of mowers. Therefore, although the following description will employ an example where the mower is in the form of a tractor that supports a number of mower decks, it should be understood that any type of mower could be configured to implement embodiments of the present invention. The term "mower deck" should be construed as a component of a mower that houses one or more cutting blades. A mower that is configured to implement embodiments of the present invention may include one or more mower decks. The term "power plant" should be construed as the components of a mower that cause the mower to travel with a ground speed. The power plant of a mower may therefore include an engine, transmission, motor(s), and/or other components.

Figure 2:
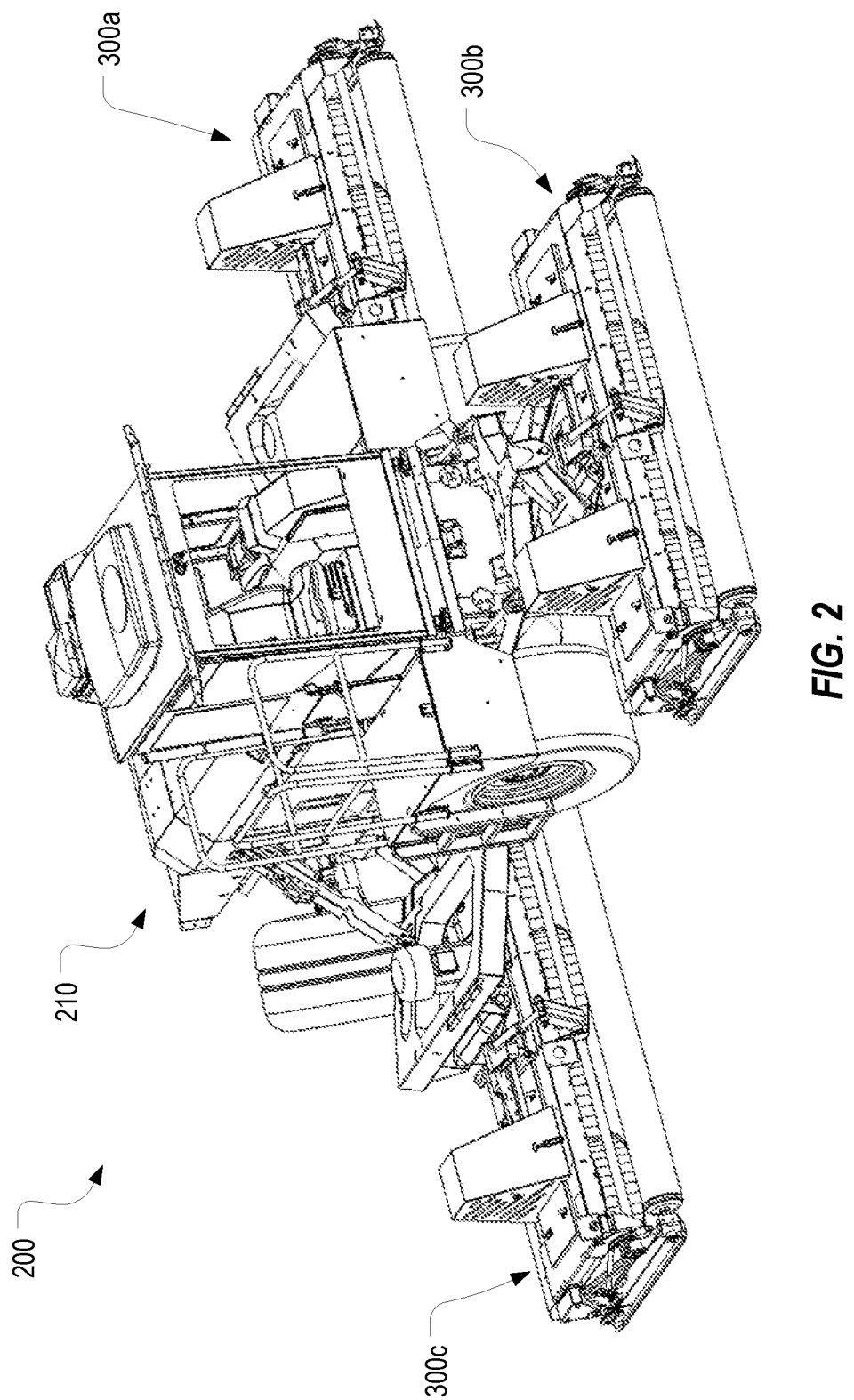
FIG. 2 illustrates an example of a mower that can be used to implement embodiments of the present invention.

FIG. 2 provides an example of a mower 200 that can be configured to implement embodiments of the present invention. As shown, mower 200 is configured as a tractor having a power plant 210 that provides power to each of multiple mower decks 300a-300c (or collectively 300) as well as to the drivetrain of the mower. In other words, power plant 210 provides power to propel mower 200 across the ground and to supply power to one or more motors on each mower deck 300 that rotate the cutting blades. Any drivetrain configuration could be used and the particular type of drivetrain is not essential to the invention. In some cases and in contrast to the depicted embodiment, the drivetrain could be coupled to wheels or rollers that form part of mower decks 300.

Figure 3:
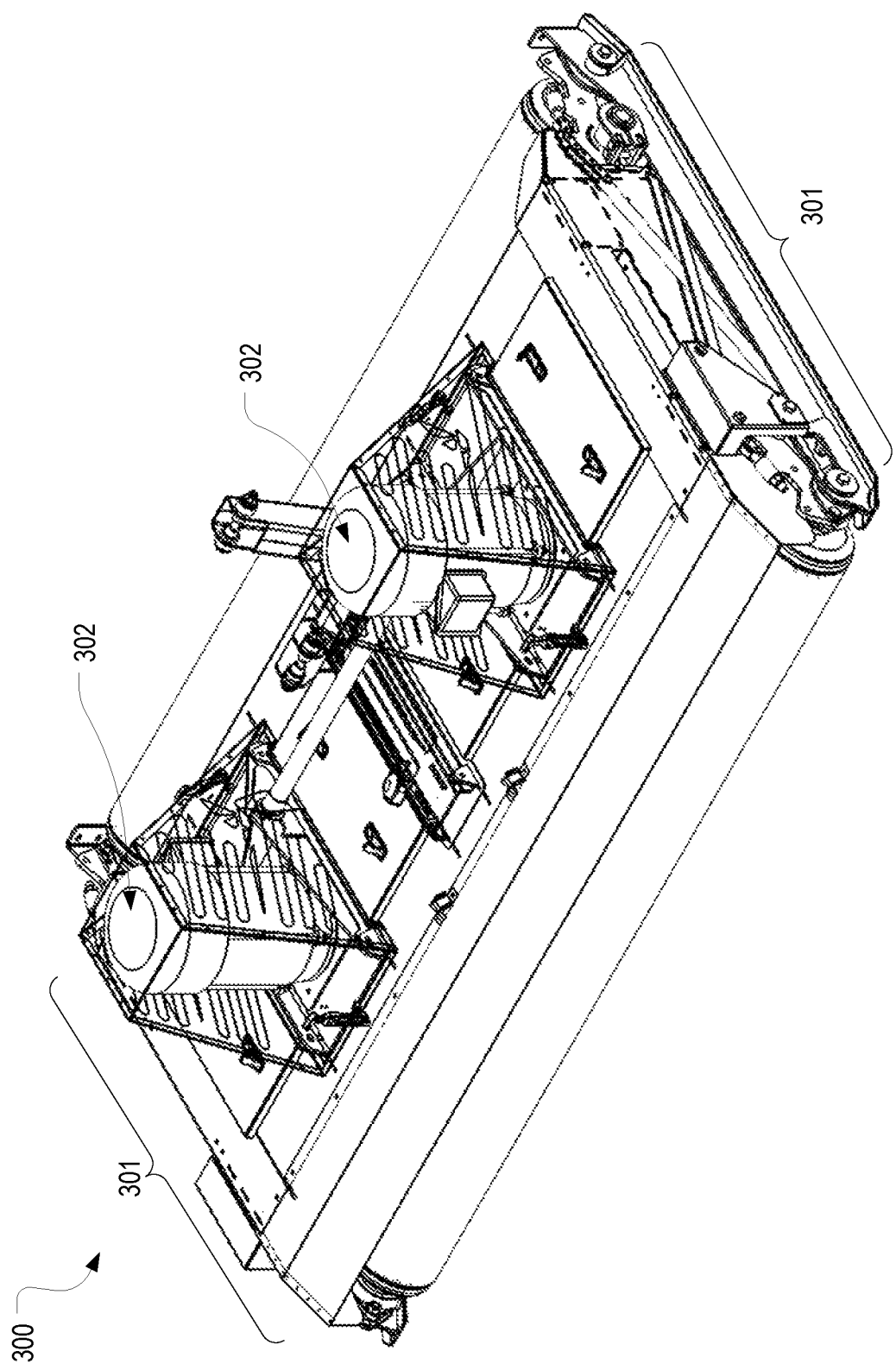
FIG. 3 illustrates a mower deck of the mower of FIG. 2.

FIG. 3 illustrates an isolated view of an example mower deck 300 that could be used on mower 200. Mower deck 300 houses a number of cutting blades, which is four in the depicted example, and includes two motors 302 for driving the cutting blades. In this example, each motor 302 independently drives two cutting blades. Of course, a mower deck could include a single motor or more than two motors that drive any reasonable number of cutting blades (including a single cutting blade). Mower deck 300 also includes front and rear rollers that are coupled together via a linkage 301 that is described in detail in the '065 application. In some embodiments, the rollers can be replaced with wheels (e.g., a wheel at each corner of the mower deck). Linkage 301 allows the height of mower deck 300 relative to the ground to be adjusted uniformly with a single action as is also described in the '065 application.

Mower 200 can include a control system that is generally configured to monitor and modify operational parameters of the mower. A block diagram representing this control system is provided in FIGS. 4 and 4A. As shown, mower 200 can include a control module 220 and each of mower decks 300a-300c can include one or more actuators 405 and one or more height adjustment mechanisms 410 that are configured to adjust the cutting height of the mower deck. Control module 220 can represent any suitable type of circuitry including one or more processors, microcontrollers, FPGAs, ASICs, PLCs, etc.

Figure 4:
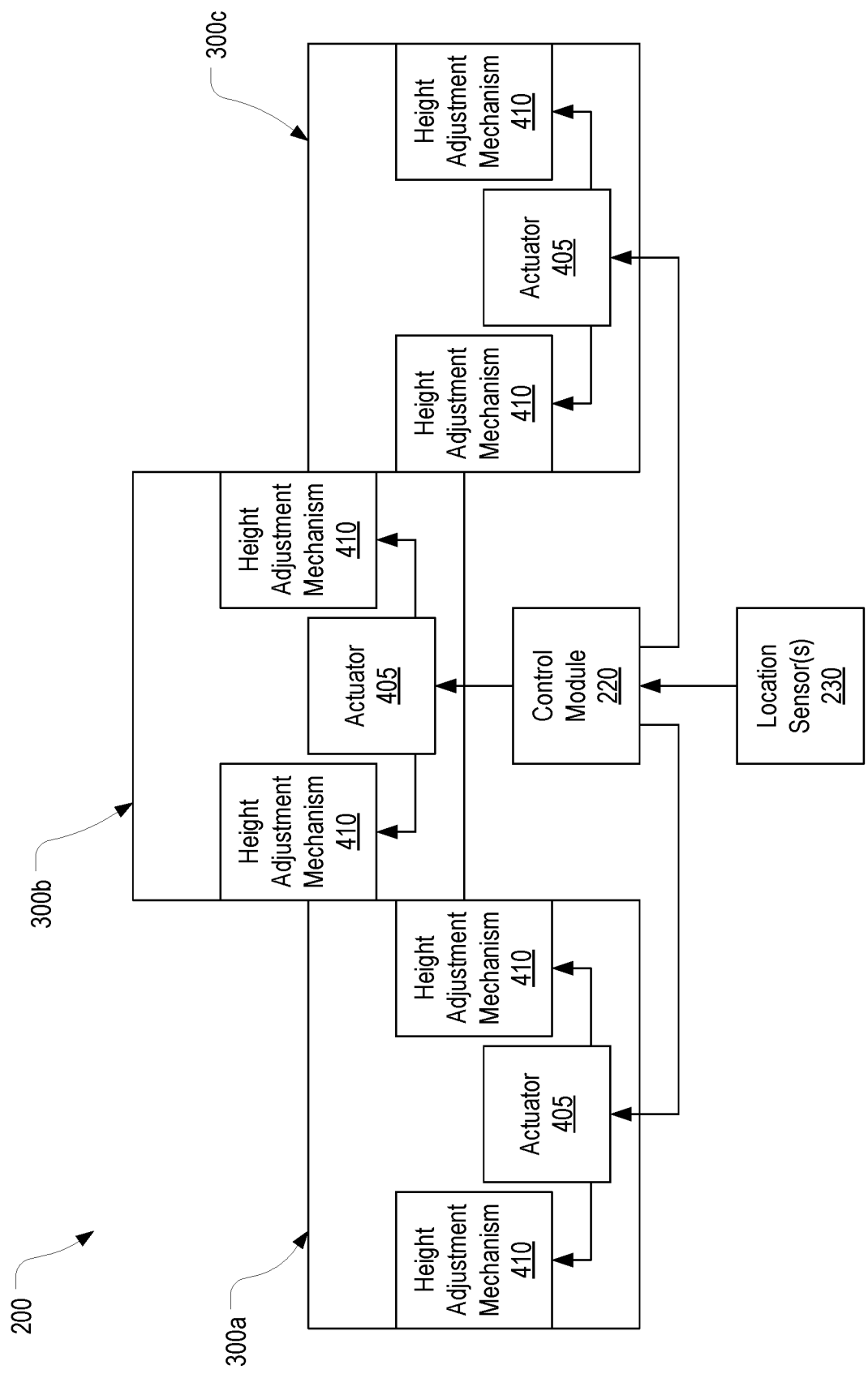
FIGS. 4 and 4A each provide a block diagram of a control system of a mower that can implement embodiments of the present invention.
Figure 4A:
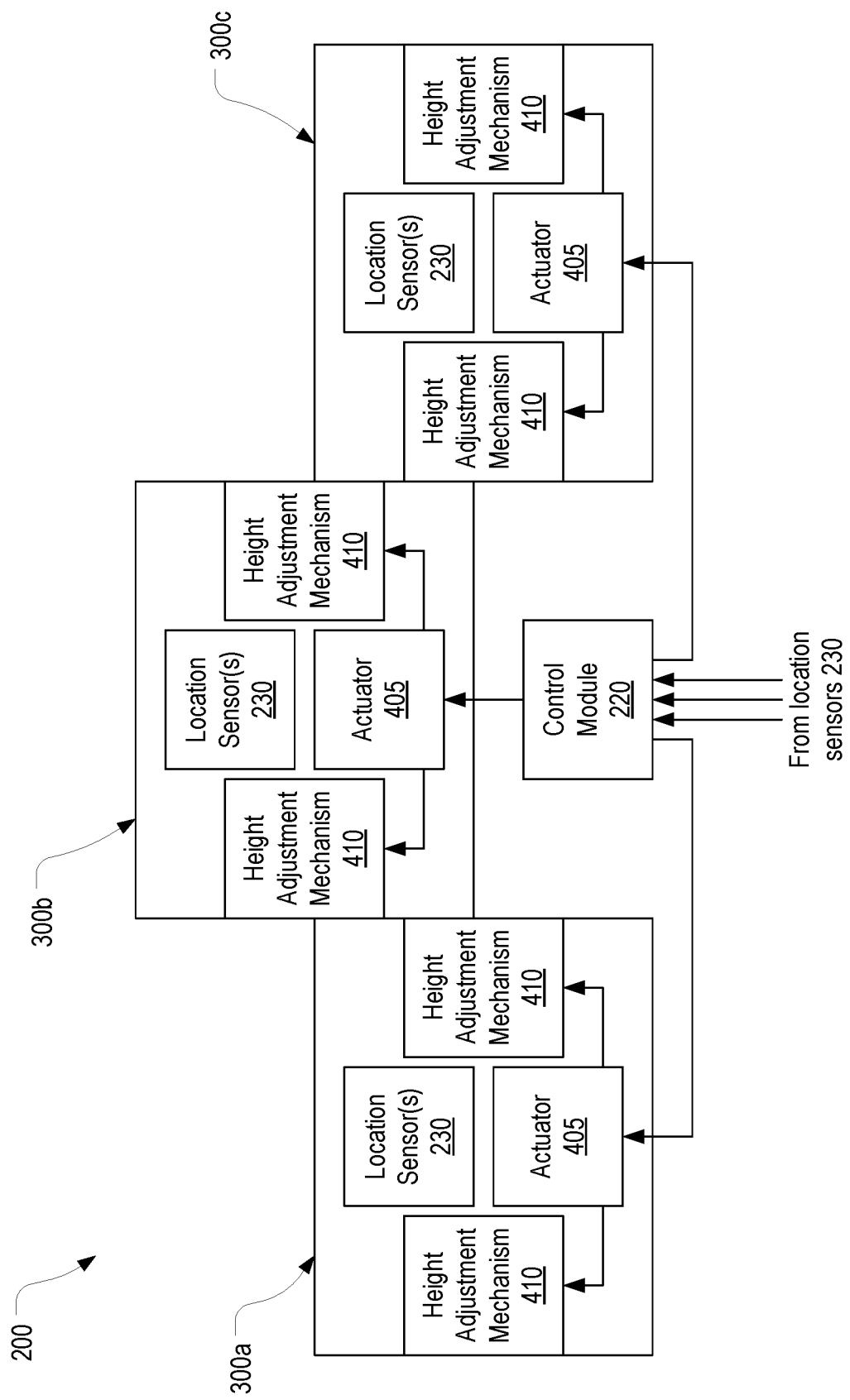

One or more location sensors 230 (e.g., a GPS sensor or buried perimeter wire sensor) can be positioned on mower 200 and coupled to control module 220 to thereby provide current location values to control module 220 which represent the current location of mower 200. FIG. 4 represents embodiments where a centralized location sensor or sensors 230 is employed (e.g., a GPS sensor on the cab of mower 200). FIG. 4A represents embodiments where each mower deck 300 may include one or more location sensors 230. In such embodiments, control module 220 can receive current location values that are specific to each mower deck as represented by the three separate arrows. These current location values can define an absolute or relative location of the mower and/or mower deck(s) at any particular time. For example, the current location values can be GPS coordinates defining the latitude and longitude of the mower or mower deck or distance values defining a distance between the location sensor(s) and a buried perimeter wire.

Each actuator 405 can represent any of the various types of actuators including linear and rotary actuators. Actuator 405 may also be driven electrically, mechanically, hydraulically, pneumatically, etc. In short, actuator 405 represents the component(s) on mower deck 300 that is configured to receive a control signal from control module 220 and, in response, apply a force to or otherwise drive height adjustment mechanism(s) 410 to cause the cutting height of mower deck 300 to be adjusted. Specific yet non-limiting examples of suitable actuators 405 include actuator 107 in the '065 application and actuators 403 and 413 and motors 506 and 516 in the '942 application. Notably, a mower deck 300 may include a single actuator 405 for driving one or more height adjustment mechanisms 410 or multiple actuators 405 for driving one or more height adjustment mechanisms 410. Accordingly, FIGS. 4 and 4A merely provide one example of many possible arrangements of actuators 405 and height adjustment mechanisms 410 on a mower deck 300.

Height adjustment mechanism 410 can represent the component(s) of mower deck 300 that enable the cutting height of the mower deck to be automatically adjusted. As described in more detail in the '065 and '942 applications, a mower deck may be supported above the ground by rolling mechanisms (e.g., wheels or rollers). Height adjustment mechanism 410 can represent at least some of the component(s) that couple one or more rolling mechanisms to mower deck 300 and that can be driven by actuator(s) 405 to adjust the vertical position of the rolling mechanism(s) relative to the main body of mower deck 300. One specific yet non-limiting example of a suitable height adjustment mechanism 410 is described in the '065 patent and includes shaft 103, support arms 104, coupling mechanisms 105 and actuating arm 106 which can be driven by actuator 107 to cause the vertical position of rollers 102 to be adjusted relative to main body 101 of mower deck 100. Other examples are described in the '942 application as height adjustment mechanisms 400, 400a and 500.

As represented by the arrows in FIGS. 4 and 4A, to adjust the cutting height of a mower deck 300, control module 220 outputs one or more cutting height control signals to actuators 405 which represent a desired cutting height for the respective mower deck 300. As described below, control module 220 could provide the same cutting height control signals to each mower deck 300 (e.g., when each mower deck 300 is intended to be set to the same cutting height) or could provide separate cutting height control signals to each mower deck 300 (e.g., when each mower deck 300 may be set to a different height relative to the other mower decks). FIGS. 4 and 4A represent embodiments where control module 220 is configured to provide separate cutting height control signals to each actuator 405 on each mower deck 300 so that the cutting height of each mower deck 300 can be independently controlled. Although not shown, in some embodiments, each of actuators 405 may provide feedback to control module 220 which identifies the current position of the actuator (and therefore represents the current cutting height of the mower deck). In such cases, control module 220 can employ the feedback when generating the cutting height control signals.

FIGS. 4 and 4A also represent that actuators 405 provide a force to each height adjustment mechanism 410 on the respective mower deck 300 where the force is based on the cutting height control signal(s) received from control module 220. For example, if actuator 405 is an electric linear actuator, control module 220 may provide a cutting height control signal that defines how far a shaft of the linear actuator should be extended or retracted (e.g., by defining a number of rotations of an internal motor, by providing an encoded position, by providing a particular voltage for a specific length of time, etc.). In response, the linear actuator would be driven in accordance with the cutting height control signal thereby applying a force to cause each height adjustment mechanism 410 to be repositioned/reoriented in the manner necessary to change the relative vertical position of the rolling mechanism(s) that the height adjustment mechanism supports.

Figure 5:
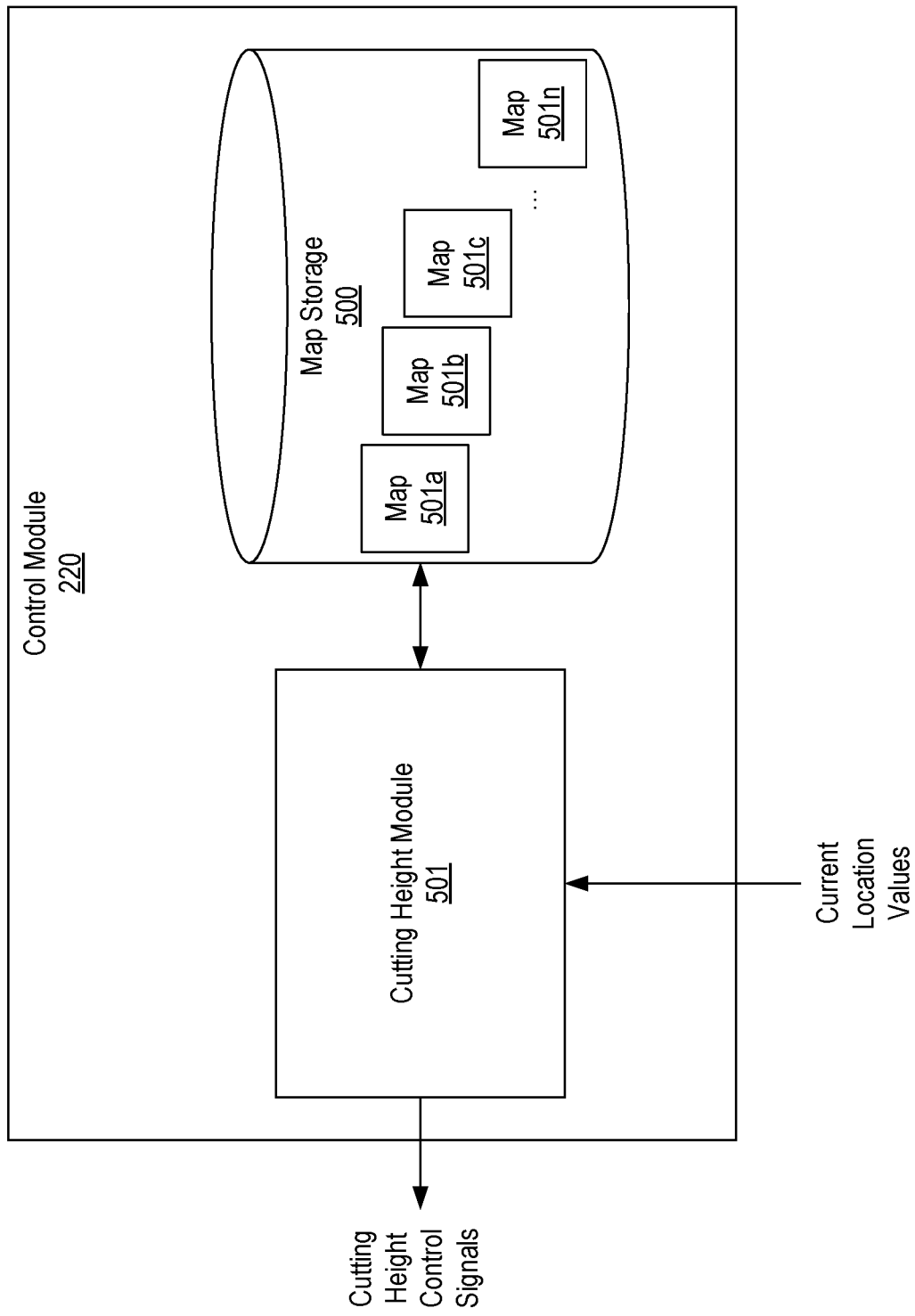
FIG. 5 illustrates an example control module of a mower's control system that can be configured to implement embodiments of the present invention.

FIG. 5 provides more detail regarding a possible configuration of control module 220. As shown, control module 220 can include, implement, be connected to or otherwise have access to a map storage 500 that can store one or more maps such as maps 501a-501n. Control module 220 can also include a cutting height module 501 which represent the component(s) or portion(s) of control module 220 that are configured to generate cutting height control signals based on current location values received from location sensor(s) 230 and an applicable map stored in map storage 500.

Figure 1:
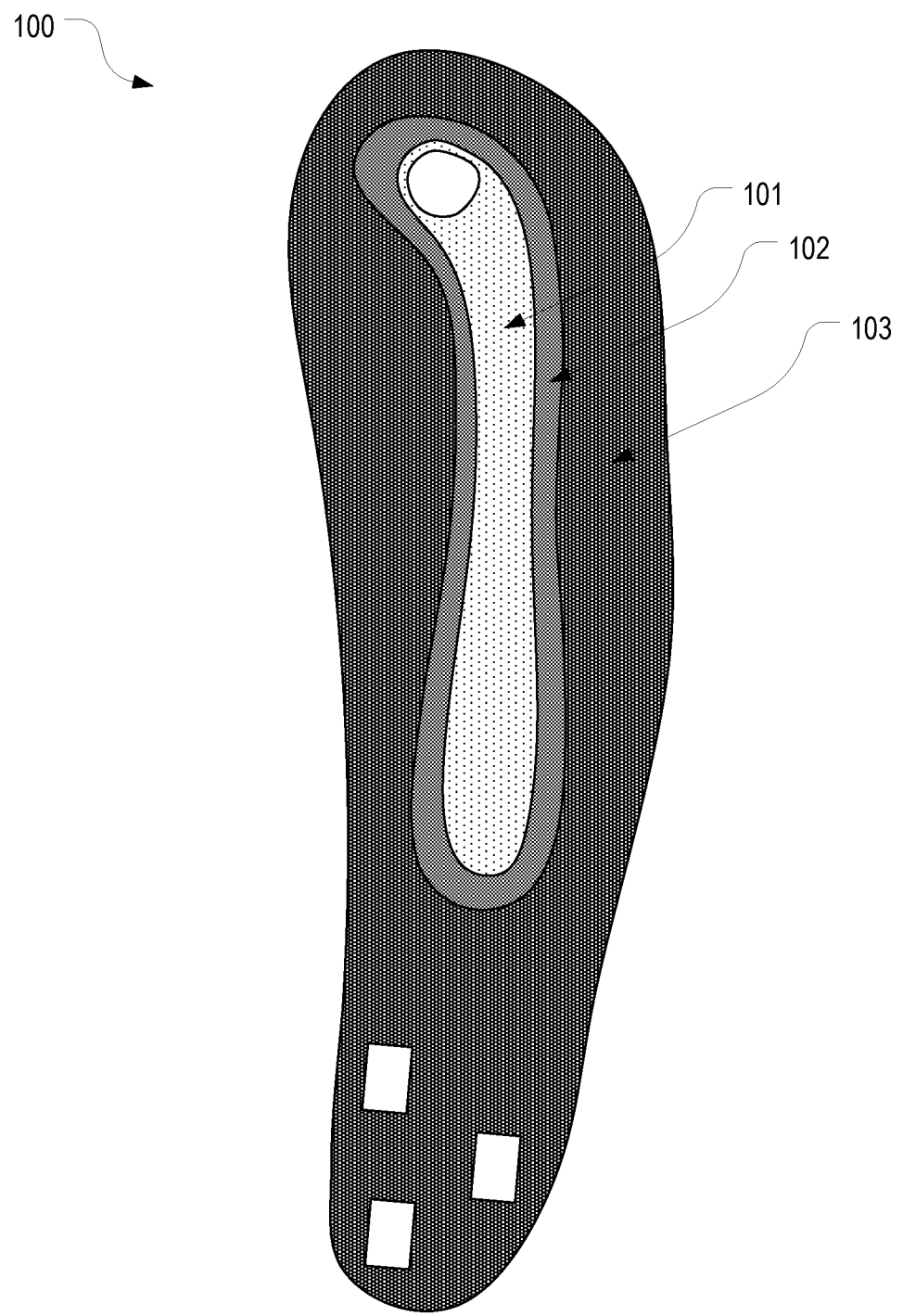
FIG. 1 illustrates an example of a grassy area that has sections that are cut to different heights.

Each map 501a-501n can encompass a particular area and can define a boundary for any section of grass within the area that is to be cut at a particular height. For example, with reference to FIG. 1, a map could define the boundary of fairway 101, the boundary of the first cut of rough 102 and the boundary of the second cut of rough 103. Each map can also specify a particular cutting height for each defined section. For example, a map could define a cutting height of 0.5 inches for the fairway 101, a cutting height of 1 inch for the first cut of rough 102 and a cutting height of 2 inches for the second cut of rough 103.

Maps 501a-501n may be structured in any suitable way or format. For example, each map may be in the form of a Keyhole Markup Language (KML) file, a GPS Exchange Format (GPX) file, a GeoJSON file, etc. The following snippet of markup represents a KML-based example of a map that could be used for hole 100 of FIG. 1. As shown, each section is defined in a Placemark element that includes a LineString element that defines the boundary of the section as a series of coordinates (which may be absolute or relative coordinates) and uses the ExtendedData element to define the Cutting Height as custom data.

```
<Document>
    <name>Hole 1</name>
    <Placemark>
        <name>Fairway</name>
        <ExtendedData>
            <Data name = "Cutting Height">
                <value>0.5</value>
            </Data>
        </ExtendedData>
        <LineString>
            <coordinates>
                X_{a1}, Y_{a1}, Z_{a1}
                X_{a2}, Y_{a2}, Z_{a2}
                X_{a3}, Y_{a3}, Z_{a3}
                ...
                X_{a1}, Y_{a1}, Z_{a1}
            </coordinates>
        </LineString>
    </Placemark>
    <Placemark>
        <name>First Cut</name>
        <ExtendedData>
            <Data name = "Cutting Height">
                <value>1</value>
            </Data>
        </ExtendedData>
        <LineString>
            <coordinates>
                X_{b1}, Y_{b1}, Z_{b1}
                X_{b2}, Y_{b2}, Z_{b2}
                X_{b3}, Y_{b3}, Z_{b3}
                ...
                X_{b1}, Y_{b1}, Z_{b1}
            </coordinates>
        </LineString>
```

-continued

```
        </Placemark>
        <Placemark>
            <name>Second Cut</name>
            <ExtendedData>
                <Data name = "Cutting Height">
                    <value>2</value>
                </Data>
            </ExtendedData>
            <LineString>
                <coordinates>
                    X_{c1}, Y_{c1}, Z_{c1}
                    X_{c2}, Y_{c2}, Z_{c2}
                    X_{c3}, Y_{c3}, Z_{c3}
                    ...
                    X_{c1}, Y_{c1}, Z_{c1}
                </coordinates>
            </LineString>
        </Placemark>
    </Document>
```

Cutting height module 501 can employ the current location values it receives from location sensor(s) 230 to determine which section of an area a mower deck 300 is within and then identify the cutting height assigned to that section. Cutting height module 501 can do so by tracking the current location values (i.e., by tracking where each mower deck 300 is) and comparing them to the boundary of one or more sections defined within any applicable map. When cutting height module 501 determines that a particular mower deck 300 is within the boundary of a particular section, it can generate cutting height control signal(s) to cause the particular mower deck to be set to the cutting height defined for the particular section. In this way, cutting height module 501 can dynamically adjust the cutting height of a mower deck 300 based on the location of the mower deck.

In some embodiments, to properly determine when a particular mower deck 300 is within a boundary, cutting height module 501 can maintain an offset or offsets of the particular mower deck relative to the current location values. For example, if location sensor(s) 230 were mounted on the top of the cab of mower 200, mower deck 300*a* and 300*c* would be offset to the left and right respectively relative to the current location values while mower deck 300*b* would be offset in front of the current location values. Cutting height module 501 can be programmed with such offsets so that they can be employed when calculating, based on current location values, whether each mower deck 300 is within a section. These offsets can preferably represent a relative location of an edge or edges of mower deck 300.

In some embodiments, cutting height module 501 may model each mower deck 300 as a two-dimensional shape (e.g., a rectangle) and maintain an offset of the shape relative to the current location values. In this way, cutting height module 501 can employ the current location values to track the movement of the shape across the area and compare this movement to the boundaries of sections defined in the applicable map(s).

Figure 6A:
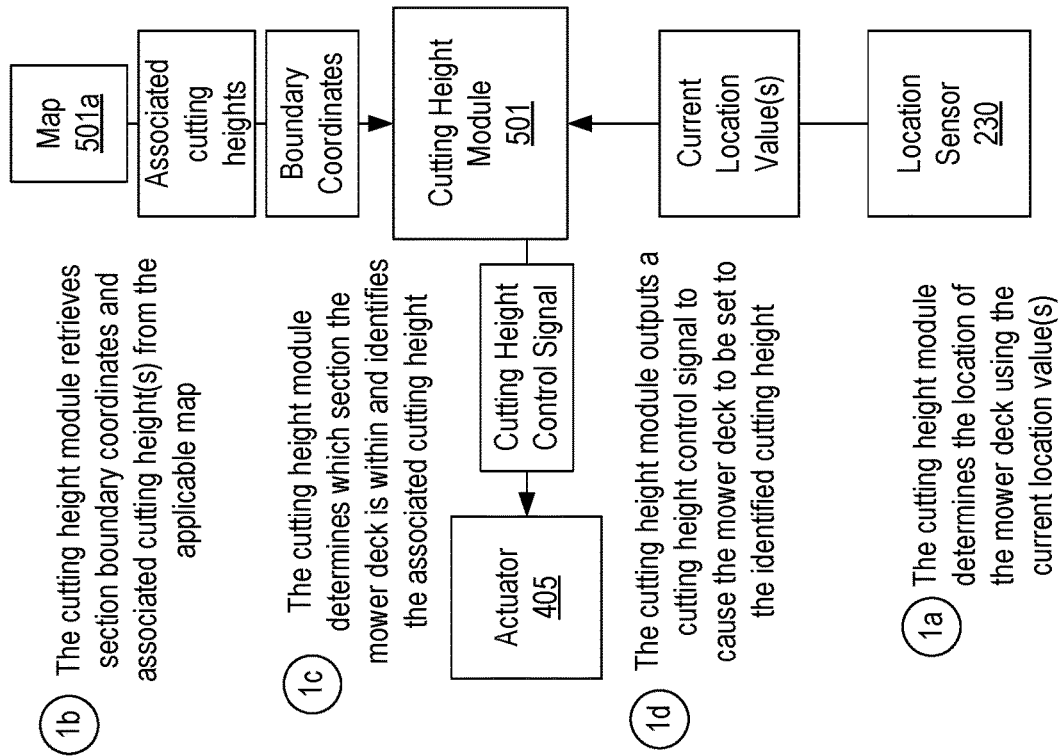
FIGS. 6A-6C provide an example of how the cutting height of a mower deck can be dynamically adjusted based on a mower's location.
Figure 6A:
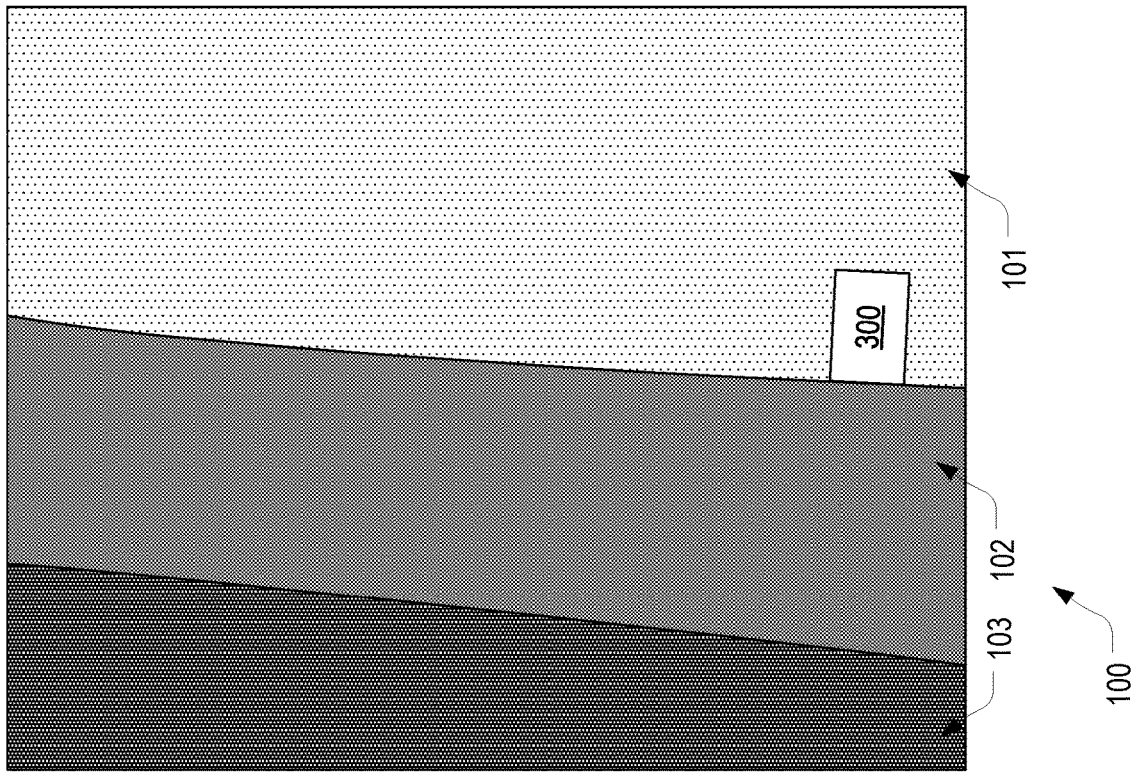
Figure 6B:
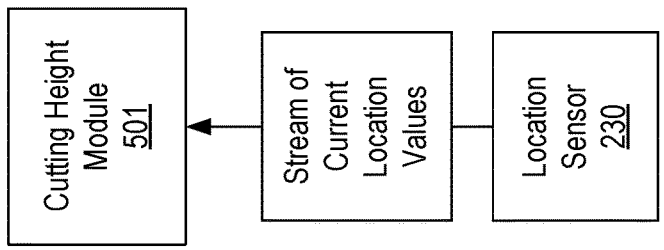
Figure 6B:
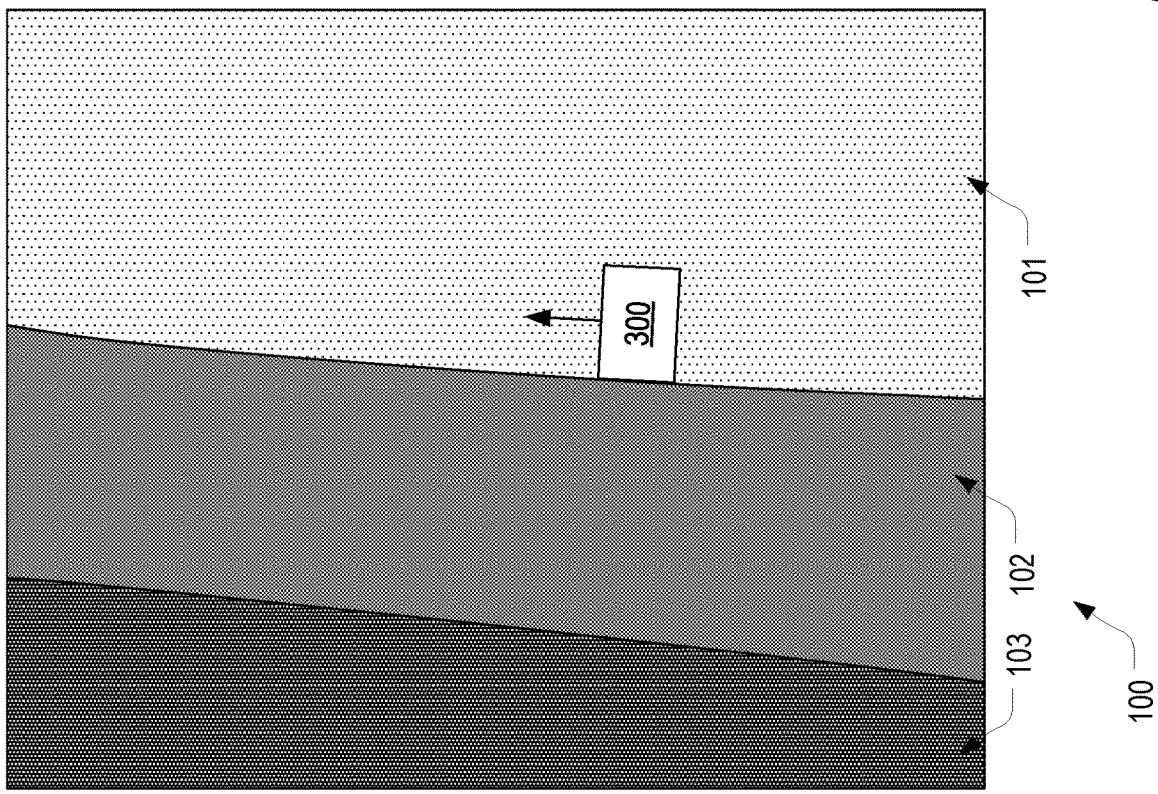
Figure 6C:
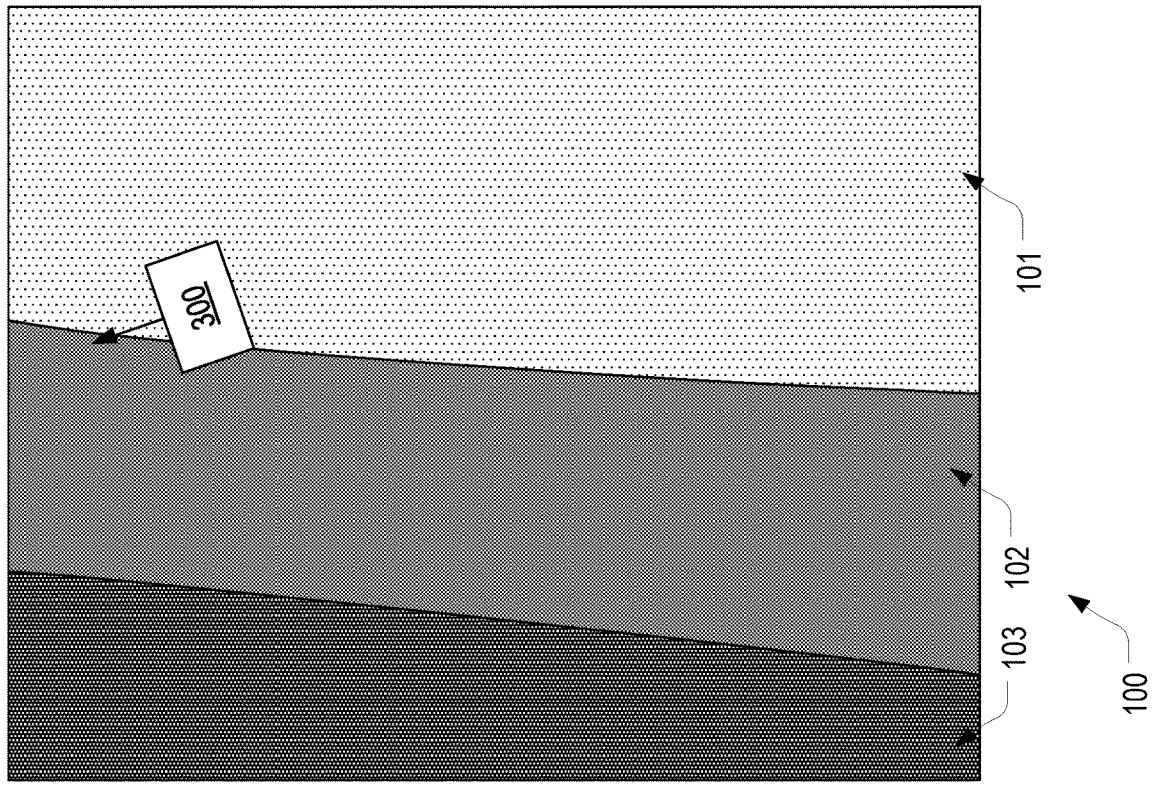

FIGS. 6a-6C represent an example process by which cutting height module 501 can dynamically adjust the cutting height of mower deck 300 based on the location of the mower. To facilitate the explanation, the process will be described in the context of a mower located within an area that encompasses hole 100. In the example, it will be assumed that the mower includes a single mower deck 300. It will also be assumed that the mower is initially located within fairway 101 and is not yet moving as represented in FIG. 6A. Although this example describes the process of dynamically adjusting the cutting height using a particular sequence of steps, the process need not perform the steps in this sequence in each embodiment.

In step 1*a*, shown in FIG. 6A, cutting height module 501 can initially read the current location value(s) that it receives from location sensor(s) 230 to thereby determine the location of mower deck 300. As mentioned above, cutting height module 501 may, if necessary, apply known offsets to the current location value(s) to determine precisely where mower deck 300 is located. For example, cutting height module 501 may employ a known offset or offsets to determine the precise location of the front, back, left and/or right edges of mower deck 300.

In step 1*b*, which may or may not be performed after step 1*a*, cutting height module 501 can retrieve the boundary coordinates for any section defined within a map applicable to the current area within which mower deck 300 is located. As an example, cutting height module 501 may obtain the current location value(s) and use them to identify and retrieve a map or maps that encompass the area within which the current location value(s) fall. Cutting height module 501 could then read the coordinates which define the boundary of any section included in the applicable map(s). Alternatively, in embodiments where a single map is employed, cutting height module 501 may simply access the map and read the coordinates which define the boundary of any section included in the map. In other embodiments, cutting height module 501 may be configured to select a map based on user input. For example, an operator or remote user could specify that the mower is on hole 100 and in response, cutting height module 501 can select the map or maps associated with hole 100.

Step 1*b* may also include retrieving the cutting height associated with each section. Alternatively, cutting height module 501 may retrieve the cutting height only after identifying which section the mower deck 300 is within. In short, step 1*b* encompasses identifying any map that is applicable to the area to be cut and obtaining from any identified map the boundaries of each section defined for the area and possibly the cutting height defined for each section. In this context, the term "map" should be construed as encompassing a file, a portion of a file or any data structure that defines a boundary and a cutting height for one or more sections within an area of grass to be cut.

In the present example, it will be assumed that cutting height module 501 uses the current location value(s) to identify that the current location of mower deck 300 is within an area encompassed by map 501*a*. Accordingly, cutting height module 501 may retrieve or otherwise access the coordinates defining the boundary of each section defined in map 501*a* and the cutting height assigned to each of these sections. These sections would include the fairway 101, the first cut of rough 102 and the second cut of rough 103.

In step 1*c*, cutting height module 501 employs the current location value(s) and the retrieved coordinates defining the boundaries of the sections within the area to be cut to determine which section mower deck 300 is within. Given that the sections may have a nested arrangement, cutting height module 501 can determine that mower deck 300 is within a section when its current location falls within the boundary of the section but is outside the boundary of any other interior section. For example, cutting height module 501 can determine that mower deck is within the first cut of rough 102 when its current location is inside the boundary of the first cut of rough 102 (and therefore also within the boundary of the second cut of rough 103) but outside the boundary of the fairway 101. Accordingly, in embodiments where the area to be cut includes a nested arrangement of sections (e.g., a golf course), cutting height module 501 can compare the current location value(s) to the boundaries of each section within the area to thereby determine which of the sections the mower deck is in. In other embodiments, however, an area may be divided into sections that do not overlap (e.g., a baseball field where the infield is cut at one height and the outfield is cut at another height). In such embodiments, cutting height module 501 may determine that the mower deck is within a particular section without necessarily comparing the current location value(s) to the boundary of each section in the area.

In some embodiments, a map can arrange sections hierarchically to facilitate the determination of which section a mower deck is within. For example, map 501*a* could define that the fairway 101 is within the first cut of rough 102 and that the first cut of rough 102 is within the second cut of rough 103. The following snippet of markup, which is based on the above snippet, represents one way in which this hierarchical arrangement of sections could be defined.

```
...
<name>Fairway</name>
<ExtendedData>
    <Data name = "Cutting Height">
        <value>0.5</value>
    </Data>
    <Data name = "Hierarchical Position">
        <value>3</value>
    </Data>
</ExtendedData>
...
<name>First Cut</name>
<ExtendedData>
    <Data name = "Cutting Height">
        <value>1</value>
    </Data>
    <Data name = "Hierarchical Position">
        <value>2</value>
    </Data>
</ExtendedData>
...
<name>Second Cut</name>
<ExtendedData>
    <Data name = "Cutting Height">
        <value>2</value>
    </Data>
    <Data name = "Hierarchical Position">
        <value>1</value>
    </Data>
</ExtendedData>
...
```

In this example, a Hierarchical Position custom data element is employed to associate the coordinates defining the boundary of each section with a number or other identifier that defines the section's order in the hierarchy. For example, the second cut of rough 103, which is the outermost section, is assigned a value of 1 for its Hierarchical Position. The first cut of rough 102 is assigned a value of 2 for its Hierarchical Position to indicate that its boundary is within the boundary of the second cut of rough 103. Similarly, the fairway 101 is assigned a value of 3 for its Hierarchical Position to indicate that its boundary is within the boundary of the first cut of rough 102 and within the boundary of the second cut of rough 103. In this case, if cutting height module 501 identifies that the current location of mower deck 300 is within the boundary of the fairway 101, it can immediately select the cutting height associated with the fairway 101 based on the fact that the fairway 101 is assigned the highest Hierarchical Position. Cutting height module 501 can perform this immediate selection even if it has not yet compared the current location value(s) to the boundaries of the other sections.

After identifying section a mower deck 300 is within and which cutting height is assigned to that section, in step 1*d*, cutting height module 501 can output one or more cutting height control signals to actuator(s) 405 on mower deck 300 to cause the cutting height of mower deck 300 to be set to the assigned cutting height. For example, assuming map 501*a* associates a cutting height of 0.5 inches with the fairway 101, cutting height module 501 can output cutting height control signals that will cause actuator 405 to drive height adjustment mechanism(s) 410 to raise or lower the cutting height to 0.5 inches.

Turning to FIG. 6B, it is assumed that the mower has commenced travelling along fairway 101 with the left edge of mower deck 300 following the boundary of the fairway 101. This could be accomplished by an operator that manually steers the mower. Alternatively, as described in more detail below, the mower could be autonomous in which case control module 220 could automatically steer the mower along the boundary of fairway 101. In either case, and as represented by step 2*a*, cutting height module 501 can continuously monitor the stream of current location values that location sensor(s) 230 output as the mower travels along the fairway 101.

In step 2*b*, cutting height module 501 can track the current location of mower deck 300 using the current location values and compare the current location to the boundary of fairway 101. For example, cutting height module 501 may employ any known offsets to calculate, from the current location values, the precise location (or path) of the left edge of mower deck 300. Because cutting height module 501 knows that mower deck 300 is within the boundary of fairway 101, it can repeatedly compare the location or path of mower deck 300 to the boundary of fairway 101 to identify whether or when mower deck 300 crosses the boundary. In this example, it is assumed that mower deck 300 remains within the boundary of fairway 101, and therefore, cutting height module 501 will maintain the cutting height of mower deck 300 (e.g., by not sending cutting height control signals that would cause actuator(s) 405 to adjust height adjustment mechanism(s) 410).

In this example, it is assumed that cutting height module 501 knows that the fairway 101 is the innermost section and therefore it is not necessary to detect whether mower deck 300 has or will cross into an inner section. In other words, cutting height module 501 can be configured to detect when it is within an innermost section and, in response, can compare the current location values to the boundary of only the innermost section. However, when cutting height module 501 is not within the innermost section, or is not configured to know when it is within the innermost section, cutting height module 501 can compare the current location values to the boundary of the current section, the boundary of a nested section and possibly the boundaries of all sections within the area.

Turning now to FIG. 6C, it is assumed that the mower has continued to travel and has turned to the left thereby causing mower deck 300 to cross the boundary of fairway 101 into the first cut of rough 102. For example, an operator or control module 220 could steer the mower into the first cut of rough 102 after completing the mowing of fairway 101, to avoid an obstacle in fairway 101, to travel to another hole, etc.

As represented by steps 3*a* and 3*b*, cutting height module 501 can continue to monitor the stream of current location values and use them to track the current location of mower deck 300 relative to the boundary of fairway 101. As a result of this continuous monitoring and comparison, in step 3c, cutting height module 501 will detect that the current location of mower deck 300 passes over the boundary of fairway 101 and into the first cut of rough 102. For example, when GPS coordinates are used, cutting height module 501 could track the path of mower deck 300 using the GPS coordinates received from location sensor(s) 230 and compare the path to the sequence of GPS coordinates that define the boundary of the fairway 101 to thereby determine when the path intersects the boundary.

In response to this detection, cutting height module 501 can identify, retrieve or otherwise obtain the cutting height assigned to the first cut of rough 102 (e.g., by identifying the cutting height that is associated with the coordinates that define the boundary of the section that mower deck 300 is now within). In step 3d, cutting height module 501 can generate and output one or more cutting height control signals that will cause actuator(s) 405 on mower deck 300 to adjust height adjustment mechanism(s) 410 appropriately. For example, cutting height module 501 can output cutting height control signals that cause actuator(s) 405 to reposition height adjustment mechanism(s) 410 to a cutting height of 1 inch.

Cutting height module 501 can perform this same process to detect when mower deck 300 travels from one section to another. For example, if cutting height module 501 detects that mower deck 300 has or will cross back into the fairway 101 (e.g., by detecting that the current location of mower deck 300 has or will cross inside the boundary defined by the coordinates associated with the fairway 101), it can generate cutting height control signals to cause the cutting height of mower deck 300 to be returned to 0.5 inches. Similarly, if cutting height module 501 detects that mower deck 300 has or will cross over into the second cut of rough 103 (e.g., by detecting that the current location of mower deck 300 is no longer within the boundary defined by the coordinates associated with the first cut of rough 102 but is within the boundary defined by the coordinates associated with the second cut of rough 103), it can generate cutting height control signals to raise the cutting height of mower deck 300 to match the associated cutting height.

In some embodiments, cutting height module 501 can be configured to detect when mower deck 300 will cross a boundary and can predictively generate and send cutting height control signals to adjust the cutting height. For example, as part of steps 3a and 3b, cutting height module 501 may determine that the path of mower deck 300 will cause it to cross into the first cut of rough 102 and can predictively raise the cutting height so that mower deck 300 does not cut a portion of the first cut of rough 102 at the lower height. In some embodiments, this could be accomplished by employing a threshold distance to trigger the change in the cutting height. This threshold distance could be based on the ground speed of the mower, the precision of the current location values, an amount of time required to adjust the height adjustment mechanism(s), user settings, etc. For example, assuming it takes 1 second for actuator(s) 405 to adjust the cutting height of mower deck 300, cutting height module 501 could be configured to send cutting height control signals to adjust the cutting height upon calculating that the path of mower deck 300 will cause it to cross a boundary in 1 second. In this way, cutting height module 501 can enhance the precision of the cutting height at the boundaries.

Although FIGS. 6A-6C represented a case where a mower includes a single mower deck, cutting height module 501 can perform the same process in a mower with multiple mower decks to dynamically adjust the cutting height of the mower decks based on the location of the mower decks. In some embodiments, cutting height module 501 can be configured to track the location of each of the mower decks relative to a boundary and dynamically adjust the cutting height of all mower decks to the same level whenever any of the mower decks crosses a boundary. In other embodiments, however, cutting height module 501 may set the cutting height of each mower deck independently so that the cutting height of a particular mower deck is set based on the particular section that the mower deck is within.

Figure 7A:
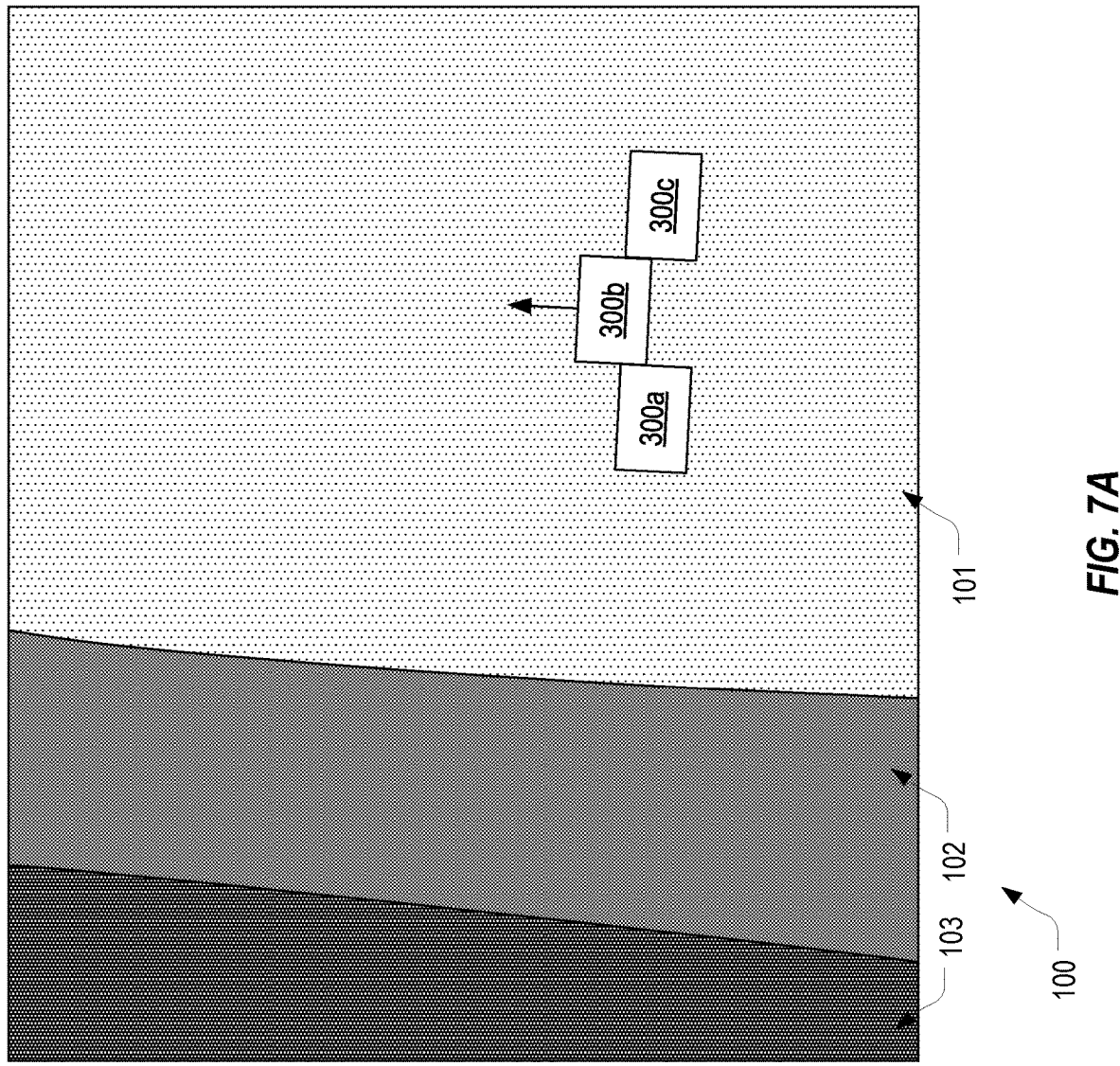

FIGS. 7A and 7B provide an example of how cutting height module 501 can set the cutting height of a mower deck independently of the cutting height of any other mower deck on the same mower. In FIG. 7A, a mower with three decks 300a-300c is shown as travelling within the fairway 101. As the mower travels, cutting height module 501 can perform the above described process to track the location or path of each of mower decks 300a-300c relative the boundary of the fairway 101 (and possibly the boundary of any other section within the area). This tracking may entail calculating a precise location of each of the mower decks using one or more offsets relative to the current location values received from location sensor(s) 230. Because each of mower decks 300a-300c is within the fairway 101, cutting height module 501 can maintain the cutting height of each mower deck.

Turning to FIG. 7B, it is assumed that the mower has travelled to the point that mower deck 300a is located within the first cut of rough 102 while mower decks 300b and 300c remain in the fairway 101. Because it can track the location of each mower deck individually, cutting height module 501 can detect when mower deck 300a has passed or will pass into the first cut of rough 102. In response, cutting height module 501 can send one or more cutting height control signals to actuator(s) 405 on mower deck 300a to cause its cutting height to be dynamically adjusted to match the cutting height assigned to the first cut of rough 102. In contrast, cutting height module 501 can detect that mower decks 300b and 300c are still within the fairway 101 and can maintain their cutting height. Accordingly, in FIG. 7B, the cutting height of mower deck 300a is higher than the cutting height of mower decks 300b and 300c. As explained above, cutting height module 501 can raise the height of mower deck 300a upon detecting that it has crossed or will cross the boundary of the fairway 101 so that the first cut of rough 102 is not cut too short.

In the examples provided above, the height of the mower deck has been dynamically adjusted as the mower deck crosses into a section that is assigned a taller cutting height. Therefore, cutting height module 501 has been described as adjusting the cutting height when any portion of the mower deck crosses the boundary. However, when a mower deck transitions from a section that is assigned a taller cutting height to a section that is assigned a shorter cutting height (e.g., from the first cut of rough 102 into the fairway 101), cutting height module 501 can instead adjust the cutting height when it is determined that the mower deck has fully transitioned into the shorter section. By maintaining offsets for each edge of the mower deck and/or by modeling the mower deck as a two-dimensional shape, cutting height module 501 can accurately detect when the mower deck is overtop two or more sections and can adjust the cutting height accordingly. As suggested, cutting height module 501 will typically be configured to set the mower deck to the tallest cutting height assigned to any section that the mower deck is currently overtop.

Embodiments of the present invention may be implemented on an autonomous mower. For example, control module 220 could be configured to employ the current location values received from location sensor(s) 230 and any map applicable to an area to be cut to automatically steer the mower. As control module 220 steers the mower, cutting height module 501 can perform the functionality described above to dynamically adjust the cutting height of each mower deck on the mower as the mower deck transitions from one section to another.

In embodiments where the sections have a nested arrangement, control module 220 can be configured to initially steer the mower along the boundary of the innermost section and then proceed inwardly until the entire section has been cut. Control module 220 can then repeat this process at the next outward section and so on until all sections have been cut. In this way, control module 220 can minimize the number of adjustments that cutting height module 501 will need to make. This outward progression can also simplify the processing that cutting height module 501 will need to perform since there will be no need to monitor whether a mower deck has passed into an inner section since the inner section will have already been cut.

FIG. 8 provides an example of an area 800 that includes sections 801, 802 that are arranged in a checkerboard pattern. In a similar manner as described above, cutting height module 501 can dynamically adjust the cutting height of each of mower decks 300a-300c to create or maintain this checkerboard pattern. For example, a map could be created for area 800 which defines the boundaries of each section 801, 802 and a cutting height for each section. Using this map and the current location values, cutting height module 501 can detect when each mower deck 300a-300c transitions from one section to another and can dynamically adjust the cutting height accordingly.

Assuming sections 801 are assigned a shorter cutting height than sections 802, and assuming the mower is travelling in the direction shown in FIG. 8, cutting height module 501 could detect when the front edge of each of mower decks 300a-300c crosses or is about to cross the boundary of section 801 into section 802 and can dynamically raise the mower deck. Similarly, cutting height module 501 could detect when the rear edge of each of mower decks 300a-300c crosses or is about to cross the boundary of section 802 into section 801 and can dynamically lower the mower deck. Given that mower deck 300b is positioned in front of mower decks 300a and 300c, cutting height module 501 would adjust the height of mower deck 300b before adjusting the cutting height of mower decks 300a and 300c. The ability to independently adjust the cutting height of each mower deck enables this functionality.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A mower comprising:
    a plurality of mower decks, each of the mower decks including at least one actuator and at least one height adjustment mechanism that is driven by the at least one actuator, the at least one height adjustment mechanism controlling a cutting height of the . respective mower deck;
    one or more location sensors that provide current location values; and
    a control system that is coupled to the one or more location sensors and to the at least one actuator of each of the mower decks, wherein the control system is configured to perform a method for dynamically adjusting the cutting height of the mower decks while the mower travels within an area of grass to be cut, the method comprising:
        maintaining one or more offsets for each of the mower decks which define a location of the respective mower deck relative to the one or more location sensors;
        monitoring the current location values provided by the one or more sensors;
        determining, from the current location values and the respective one or more offsets, a current location of each of the mower decks;
        detecting that the current location of each of the mower decks is within a particular section of the area;
        identifying a particular cutting height assigned to each particular section; and
        providing one or more cutting height control signals to the at least one actuator of each of the mower decks, the one or more cutting height control signals causing the at least one actuator to drive the at least one height adjustment mechanism to thereby set the cutting height of the respective mower deck to the particular cutting height.

2. The mower of claim 1, wherein detecting that the current location of each of the mower decks is within the particular section of the area comprises detecting that the current location of each of the mower decks is within a boundary of the particular section.

3. The mower of claim 2, wherein the boundary is defined by a series of location coordinates.

4. The mower of claim 1, wherein the one or more cutting height control signals are provided to the at least one actuator of each of the mower decks at different times based on when the current location of the respective mower deck is detected to be within the particular section of the area.

5. The mower of claim 1, wherein detecting that the current location of each of the mower decks is within the particular section of the area comprises detecting that the current location of each of the mower decks is within a boundary of the particular section and outside a boundary of one or more other sections of the area.

6. The mower of claim 1, wherein detecting that the current location of each of the mower decks is within the particular section of the area comprises determining that the current location and the respective one or more offsets that a portion of the respective mower deck has crossed or will cross over a boundary of the particular section.

7. The mower of claim 1, wherein detecting that the current location of each of the mower decks is within the particular section of the area comprises determining that the current location and the respective one or more offsets indicates that no portion of the respective mower deck is outside a boundary of the particular section.

8. The mower of claim 1, wherein the one or more offsets define a location of one or more edges of the respective mower deck relative to the one or more locations sensors.

9. The mower of claim 1, further comprising:
modeling each of the mower decks as a two-dimensional shape;
wherein the one or more offsets define a location of the two-dimensional shape of the respective mower deck relative to the one or more locations sensors.

10. The mower of claim 9, wherein the two-dimensional shape is a rectangle.

11. The mower of claim 1, wherein the control system accesses a map storage to obtain one or more maps, the one or more maps defining boundaries of sections, including each particular section, within the area and a cutting height for each section;
wherein detecting that the current location of each of the mower decks is within the particular section of the area comprises comparing the current location of each of the mower decks to the boundary of the particular section defined in the one or more maps; and
wherein the particular cutting height is obtained from the one or more maps.

12. The mower of claim 1, wherein the current location values represent a distance to an object that is positioned at a boundary of the particular section.

13. A method, performed by a control system of a mower having plurality of mower decks, for dynamically adjusting a cutting height of the mower decks while the mower travels within an area of grass to be cut, the method comprising:
maintaining one or more offsets for each of the mower decks which define a location of the respective mower deck relative to one or more location sensors on the mower;
receiving, from the one or more location sensors on the mower, current location values;
determining, from the current location values and the respective one or more offsets, a current location of each of the mower decks;
detecting that the current location of each of the mower decks is within a particular section of the area;
identifying a particular cutting height assigned to each particular section; and
providing one or more cutting height control signals to at least one actuator on each of the mower decks, the one or more cutting height control signals causing the at least one actuator to drive at least one height adjustment mechanism on the respective mower deck to thereby set a cutting height of the respective mower deck to the particular cutting height.

14. The method of claim 13, wherein the one or more offsets define a location of one or more edges of the respective mower deck relative to the one or more locations sensors.

15. The method of claim 14, wherein the current locations of the mower decks are within different sections such that the mower decks are set to different cutting heights at the same time.

16. The method of claim 13, further comprising:
modeling each of the mower decks as a two-dimensional shape;
wherein the one or more offsets define a location of the two-dimensional shape of the respective mower deck relative to the one ore more locations sensors.

17. The method of claim 1, wherein detecting that the current location of each of the mower decks is within the particular section of the area comprises one of:
calculating, from the current location values and the respective one or more offsets, that an edge of the respective mower deck has crossed or will cross a boundary of the particular section; or
calculating, from the current location values and the respective one or more offsets, that no portion of the respective mower deck extends beyond a boundary of the particular section.

18. A method, performed by a control system of a mower having a plurality of mower decks, for dynamically adjusting a cutting height of the mower decks while the mower travels within an area of grass to be cut, the method comprising:
modeling each of the mower decks as a two-dimensional shape;
maintaining one or more offsets for each of the mower decks which define a location of the two-dimensional shape of the respective mower deck relative to one or more location sensors on the mower;
receiving, from the one or more location sensors on the mower, current location values;
determining, from the current location values and the respective one or more offsets, a current location of the two-dimensional shape of each of the mower decks;
detecting that the current location of two-dimensional shape of each of the mower decks is within a particular section of the area;
identifying a particular cutting height assigned to each particular section; and
providing one or more cutting height control signals to at least one actuator to drive at least one height adjustment mechanism on the respective mower deck to thereby set a cutting height of the respective mower deck to the particular cutting height.

19. The method of claim 18, wherein the one or more cutting height control signals are provided to the at least one actuator of each of the mower decks at different times based on when the current location of the two-dimensional shape of the respective mower deck is detected to be within the particular section of the area.

20. The method of claim 18, wherein detecting that the current location of the two-dimensional shape of each of the mower decks is within the particular section of the area comprises calculating, from the current location values and the respective one or more offsets, that no portion of the two-dimensional shape of the respective mower deck extends beyond a boundary of the particular section.

* * * * *